US012694122B2

(12) United States Patent
Conway

(10) Patent No.: US 12,694,122 B2
(45) Date of Patent: Jul. 28, 2026

(54) SYSTEMS AND METHODS FOR REVERSE ENGINEERING-BASED DETECTION OF VULNERABILITIES

(71) Applicant: BigBear.ai LLC, Columbia, MD (US)

(72) Inventor: Eric Conway, Columbia, MD (US)

(73) Assignee: BigBear.ai LLC, Columbia, MD (US)

( * ) Notice: Subject to any disclaimer, the term of this patent is extended or adjusted under 35 U.S.C. 154(b) by 217 days.

(21) Appl. No.: 18/219,084

(22) Filed: Jul. 6, 2023

(65) Prior Publication Data

US 2025/0013753 A1 Jan. 9, 2025

(51) Int. Cl.
*G06F 21/57* (2013.01)
*G06F 8/74* (2018.01)
(52) U.S. Cl.
CPC .............. *G06F 21/577* (2013.01); *G06F 8/74* (2013.01)
(58) Field of Classification Search
CPC .... G06F 21/577; G06F 8/74; G06F 2221/033; G06F 21/563; G06F 2221/034; G06F 11/3604; G06F 8/75; H04L 63/1433; H04L 63/1416
See application file for complete search history.

(56) References Cited

U.S. PATENT DOCUMENTS

| | | | |
|---|---|---|---|
| 2020/0065489 A1* | 2/2020 | Zheng | G06F 21/563 |
| 2021/0256426 A1* | 8/2021 | Calvano | G06N 20/10 |
| 2024/0202405 A1* | 6/2024 | Lang | G06F 30/27 |

* cited by examiner

*Primary Examiner* — Wasika Nipa
*Assistant Examiner* — Edgar W Xie
(74) *Attorney, Agent, or Firm* — Norton Rose Fulbright US LLP

(57) ABSTRACT

The present disclosure provides systems and methods that support identification of vulnerabilities within a dataset, such as an unknown binary, using customizable pipelines and workflows. The pipelines may be configured to apply various analysis techniques, including reverse engineering, machine learning/artificial intelligence, and other techniques to elicit various types of data and information from the unknown binary. The pipeline may include stages configured to analyze outputs of prior stages of the pipeline detect whether vulnerabilities or malicious code are present. Different stages of the pipeline may also be configured to initiate additional workflows for further analysis of the binary or intermediate representations of the binary output by prior stages of the pipeline. Additionally, the disclosed systems and methods provide functionality that enables generation of a reverse software bill of materials (SBOM) from an unknown binary or confirmation of contents of an existing SBOM.

20 Claims, 6 Drawing Sheets

500

600

610

Receive, by one or more processors, an input dataset comprising at least an unknown binary

620

Initialize, by the one or more processors, one or more pipelines configured to detect vulnerabilities within the unknown binary

630

Generate, via one or more data collectors of a first pipeline of the one or more pipelines, data based on the unknown binary

640

Determine, via the at least one information extractor of the first pipeline, whether a vulnerability is present in the unknown binary based on information extracted from the data generated by the one or more data collectors of the first pipeline

650

Generate, by the one or more processor, a reverse software bill of materials for the unknown binary based on the data generated by the one or more data collectors, the information extracted from the data generated by the one or more data collectors by the at least one information extractor, or a combination thereof

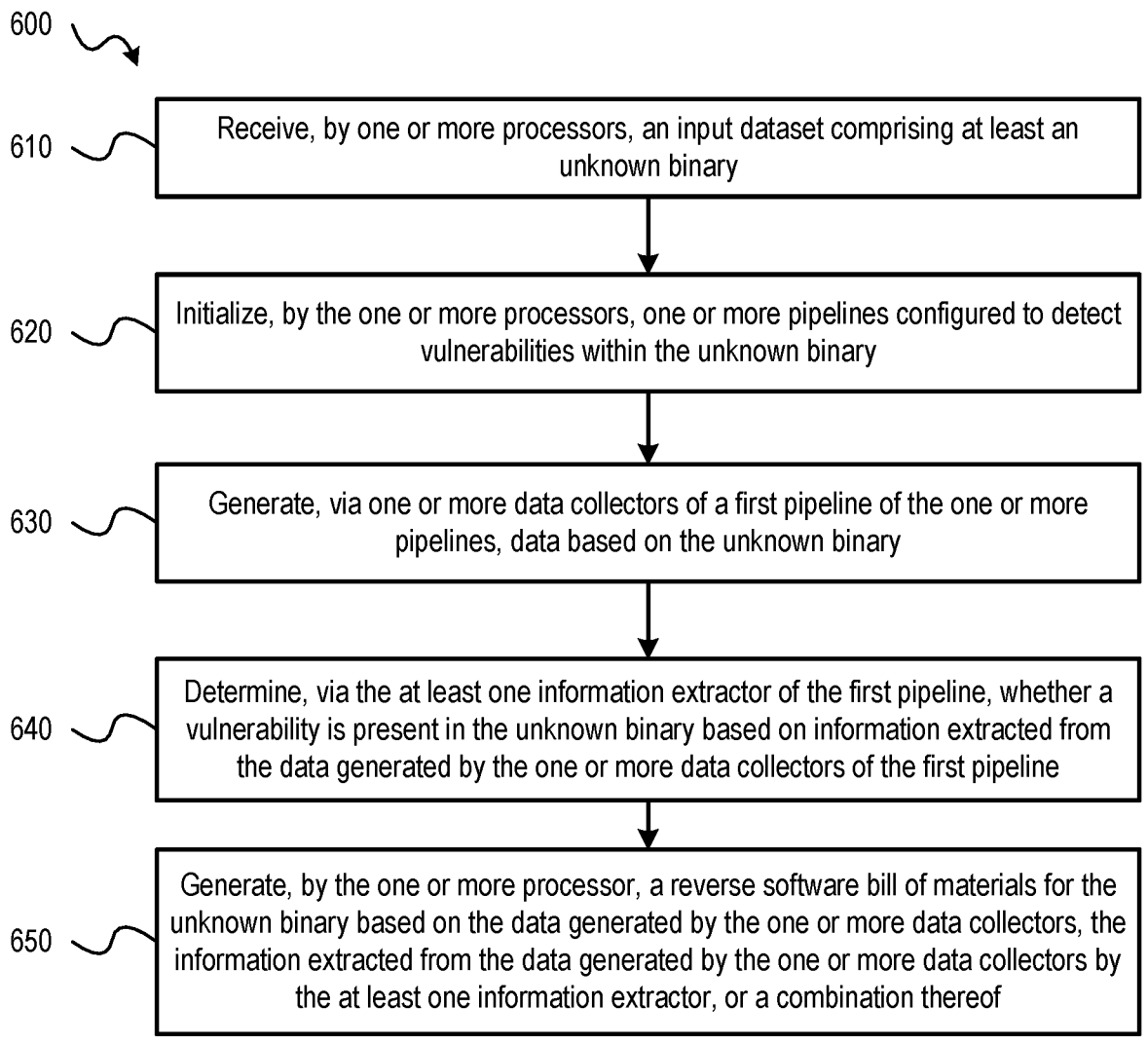

FIG. 6

SYSTEMS AND METHODS FOR REVERSE ENGINEERING-BASED DETECTION OF VULNERABILITIES

TECHNICAL FIELD

The present disclosure generally relates to security vulnerability detection and more specifically, to systems, methods, and computing architectures for rapidly detecting, quantifying, and mitigating security vulnerabilities in software.

BACKGROUND

Modern software systems are increasingly complex and composed of numerous third-party components. For example, many modern software systems are built using integrations of many existing software tools and packages (e.g., off-the-shelf software) with some custom software tools or functionality included as well. Modern software systems may include many dependencies (e.g., one component or piece of software is dependent on another component or piece of software) as a result of such integrations, making it difficult to track and manage the software components and their interdependencies.

As a result of the increasingly complexities and reuse or integration of existing software code, it has become increasingly important to be able to confirm whether malicious code or vulnerabilities are present in one or more pieces of software code prior to deployment of the software code. Moreover, such confirmation should be performed in a manner that provides a high degree of confidence with respect to identification of the contents of the software code and provides a level of trust with respect to how analysis of the software code is performed. One way software code may be evaluated or reviewed for malicious code or vulnerabilities is a Software Bill of Materials (SBOM), which is a tool used in software development to provide a comprehensive list of all software components, as well as the dependencies between those components. The SBOM may be used as an aide to help ensure compliance with regulatory requirements and manage potential security risks. For example, the SBOM allows for tracking and tracing of software components, which may be critical for identifying and addressing vulnerabilities, and enables effective risk management by providing visibility into the supply chain of software components of an application package. Additionally, an SBOM facilitates communication between stakeholders and promotes transparency in the development process, which can increase trust and confidence in a final software product.

As security risks become more prevalent and sophisticated, an SBOM provides visibility into the software supply chain and allows for an understanding of the potential risks associated with each component. This enables organizations to identify and address vulnerabilities and security risks in a timely manner. As another challenge, regulatory compliance requirements are becoming more stringent, and many industries (e.g., healthcare, finance, and government) are seeking to utilize SBOMs as part of their compliance efforts. Development Operations (DevOps) teams may be tasked with ensuring compliance with these requirements, and integration of SBOM generation into their workflows may enable DevOps teams to comply with these regulations more easily and avoid potential penalties or legal liabilities. In addition, when malware attaches itself to a system, it generally does so in binary form. To identify, diagnose, and repair any potential damage done by such malware, the ability to create an SBOM of that malware is critical.

DevOps teams are increasingly focused on software security and compliance, and an SBOM is a key tool in addressing these concerns. By integrating SBOM generation into their development and deployment workflows, DevOps teams can automatically generate and update SBOMs as part of their regular software development and deployment processes, providing them with a comprehensive view of their software supply chain and enabling them to identify and address potential security and compliance issues.

While some SBOM solutions exist, there are some problems that may occur that present challenges with respect to generating and maintaining SBOMs using such existing solutions. As an example, the unknown binary can create problems for existing SBOM generation solutions. Existing SBOM generation tools may lack the ability to produce a SBOM for a binary for which the source code and documentation are missing. This is a realistic scenario that can arise under several situations. To illustrate, a software release that emerges from a DevOps team may include third-party software components for which the source code and documentation for those components may not be available. Older legacy systems may not have source code or documentation available, or the documentation may have been lost or destroyed over time. This is often true with controllers and devices in Industrial Control Systems (ICS) where equipment was designed to operate for decades, and firmware updates are not maintained. Some software is closed source, meaning that the source code is not publicly available.

Presently, tools for generating source code from an unknown binary (e.g., a binary for which source code and documentation are unknown or incomplete) may have strengths in some areas and weaknesses in others. For example, certain binaries may be more susceptible to one tool or technique than it is to another. However, present techniques typically rely on ad-hoc tools and expertise of a subject matter expert to analyze a binary. In such instances the ability to accurately detect malicious code and vulnerabilities from the binary may be dependent on the tools available to the subject matter expert and the experience of the subject matter expert that is conducting the analysis. However, such techniques may provide unsatisfactory performance in some situations since they are limited the experience and tools the subject matter expert is familiar with or has access to, which may not include tools suitable for detecting certain types of attack vectors a given binary. Accordingly, presently available techniques for analyzing binary to detect vulnerabilities and malicious code may be error prone. Additionally, because such techniques are limited by the tools the subject matter expert is familiar with or has access too, such techniques may not provide the ability to perform analysis of binaries at scale and may be unable to detect or have difficult detecting new threats as they emerge.

In situations where an unknown binary is involved the ability to create an SBOM that identifies the components, their versions, associated licenses, and vulnerabilities remains important. In particular, without source code it can be difficult or impossible for a standard SBOM generator to accurately identify all the software components and dependencies in the binary, as well as their associated security and licensing information or, in the case of malware, the damage they are designed to inflict on the system. This can result in an incomplete or inaccurate SBOM that may not provide the necessary information to manage potential security risks and ensure compliance with applicable requirements. A lack of information about the binary's place of origin can create uncertainty about the trustworthiness of the software and its components. It becomes difficult to assess the quality and maintainability of the software, as well as to diagnose and fix issues that may arise, making it difficult to determine the appropriate security measures to implement or to decide whether the software is safe to use in a particular environment.

As shown above, it is important that a binary be analyzed using appropriate tools and techniques capable of identifying malicious code or vulnerabilities prior to deploying a piece of software (e.g., an application, a widget, an update, etc.). Additionally, such analysis should be performed in a manner that is not limited by the experience and expertise of the person conducting the analysis and/or the tools available to the person conducting the analysis. It is also important that the tools used to analyze a binary be capable of accurately extracting information that enables components, their versions, associated licenses, and vulnerabilities to be identified so that an SBOM can be created (or verified) in a manner that ensures the security of the software in a trustworthy manner.

SUMMARY

As can be appreciated from the examples above, existing processes and tools for conducting vulnerability analysis of binaries and other types of data suffer from several drawbacks that may limit the trustworthiness of software or simply render the use of it tedious and time-consuming. To address these drawbacks, embodiments of systems and methods providing functionality to support pipelined processing for analyzing an input dataset, such as a dataset including a binary, are provided, in which a variety of reverse-engineering techniques are made available, allowing the user to take advantage of the method most suited to the task at hand. The processing pipelines may be initialized according to the types of data to be analyzed and may utilize two different types of pipeline components to perform analysis, referred to herein as data collectors and information extractors. The data collectors may be configured to generate data from or about the binaries, such as to generate intermediate representations of portions of the binary (e.g., disassembly data, strings data, function call graphs, etc.) and the information extractors may be configured to identify information of significance within the data generated by the data collectors, such as information that may be used to detect whether a vulnerability is present in the binary being analyzed.

The disclosed systems and methods may provide functionality for building and extending processing pipelines. For example, data collectors and information extractors may be designed based on various tools configured to support specific types of analysis. The builder functionality may enable arrangement of these tools into pipelined processes in which a combination of data collectors and information extractors are executed in sequence to achieve a particular type of vulnerability analysis. Multiple pipelines may be created and executed in parallel to provide for rapid analysis of binaries across a variety of vulnerability assessment strategies, thereby providing a robust mechanism for performing comprehensive vulnerability analysis. Moreover, the pipelines may provide a more deterministic approach (e.g., via the sequences of operations provided by the tools of each pipeline) to performing vulnerability analysis that may eliminate some of the inconsistency that may be experienced using existing approaches, which rely on the expertise and experience of a given subject matter expert. Additionally, the ability to build new pipelines or add functionality to existing pipelines using existing tools and/or newly developed tools may allow pipelines to be rapidly developed when new or emerging vulnerabilities arise. As can be appreciated from the above-described capabilities provided by the pipeline-based processing architectures disclosed herein may also facilitate more rapid detection of vulnerabilities and more consistent detection of vulnerabilities as compared to other approaches.

In addition to the above-identified features and functionality, embodiments of the present disclosure also provide functionality to support generation of an SBOM from a binary itself. For example, an unknown binary (e.g., a binary for which no SBOM or documentation is available) may be analyzed using the capabilities provided by above-described pipeline processing architectures to elicit information from the binary that may be used to generate an SBOM via reverse engineering, referred to herein as a reverse SBOM. The ability to create reverse SBOMs provides a new way to establish trustworthiness of an unknown binary (or lack thereof in the case of malware or other malicious code) and enable appropriate risk assessments to be performed with respect to the software the unknown binary represents.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the implementations illustrated in greater detail in the accompanying drawings, wherein:

FIG. 6 is a flow diagram of an exemplary method for a flow diagram of an exemplary method for analyzing an input dataset in accordance with aspects of the present disclosure.

Figure 1:
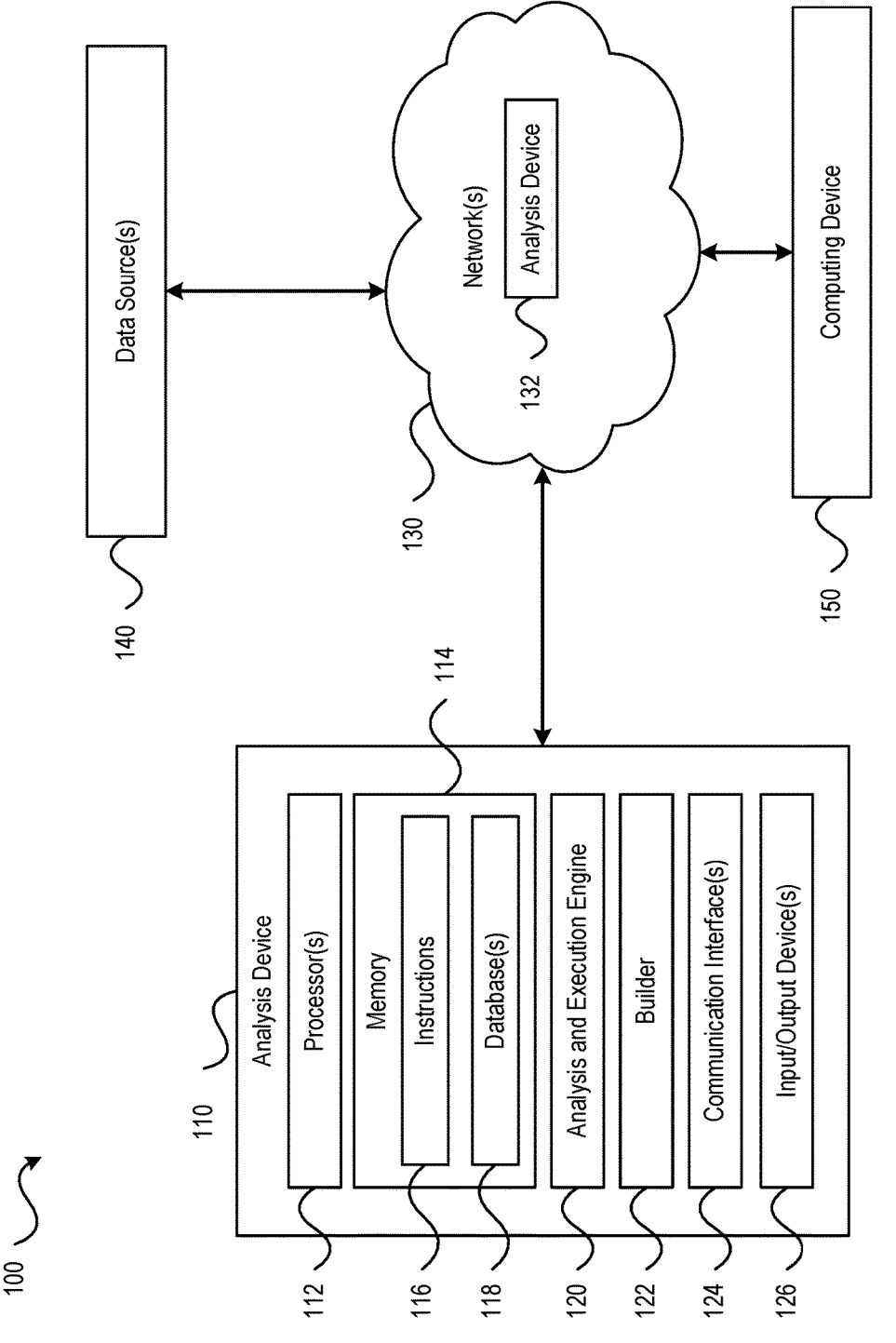
FIG. 1 is a block diagram illustrating an exemplary embodiment of a system in accordance with aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of the present disclosure provide systems and methods for improved detection of vulnerabilities and malicious code in software, software components, and the like. As an illustrative and non-limiting example, prior to deploying a piece of software code (e.g., firmware, an application, a widget, an update, etc.) in an enterprise or other computing system or device, the piece of software code represented as a binary may be provided for analysis, where it may be unknown whether the piece of software code contains malicious code, such as malware, or vulnerabilities (e.g., security vulnerabilities). To perform analysis of the binary, pipelined reverse engineering techniques may be applied to the binary, where each stage of the pipeline(s) is configured to produce data or extract information from the binary or intermediate representations of the binary (e.g., outputs of reverse engineering techniques). For example, a pipeline may begin by applying a disassembler to the binary to obtain disassembly data from the binary. The disassembly data may then be provided to another stage of the pipeline where additional data about the binary is obtained. Additional data regarding the binary or additional intermediate representations of the binary may be generated as different stages of or flows within the pipeline are activated, where data from earlier stages or flows may be passed for processing to later stages of or flows the pipeline. Information extractors within the pipeline may be configured analyze outputs of one or more prior stages of the pipeline to extract information that enables identification of the contents of the binary, such as to determine whether the binary contains malware or other types of vulnerabilities.

The disclosed systems and methods may also provide automated inspection techniques for taint analysis Return Oriented Programming (ROP) analysis. For taint analysis, the disclosed systems and methods may analyze the flow of user input through a system to detect the presence of features that enable the user to inject a code flow into, and change, the original source code. For ROP analysis the disclosed systems and methods enable detection of the presence of features that allow an attacker to execute code in the presence of security defenses, such as executable space protection and code signing. As will become more apparent in the discussion below, the systems and methods disclosed herein automate the application of multiple disparate tools through creation of pipelines and workflows, where the outputs of each tool may be stored to a unified data store for further analysis and insight derivation.

Additionally, the disclosed systems and methods support application artificial intelligence and machine learning techniques to tool outputs to quickly identify exploitable vulnerabilities in code. Such analytics may be applied to other architectures to identify, what appear to be, new malware samples but are really modifications (i.e., mutations) of existing malware, thereby enabling detection of more complex vulnerabilities that may go undiscovered or may be difficult to detect using traditional manual techniques. These techniques may also be used to perform Tactics, Techniques, and Procedures (TTP) analysis regarding malware and its origins. TTP analysis refers to how the malware interacts with a system to produce new, unexpected behavior. The disclosed systems and methods enable creation of new visual fingerprints that can capture TTPs and associated new behaviors, and other forms of advanced analytic outputs to detect malware and other vulnerabilities. The disclosed systems and methods may also be used to create a reverse SBOM (e.g., an SBOM created through reverse engineering) or verify contents of an SBOM associated with the binary. It is noted that the exemplary operations described above have been described to provide a high-level overview of the concepts disclosed herein, which are described in detail below with reference to FIGS. 1-5.

Referring to FIG. 1, a block diagram illustrating an exemplary embodiment of a system in accordance with aspects of the present disclosure is shown as a system 100. As shown in FIG. 1, the system 100 includes an analysis device 110 having one or more processors 112, a memory 114, an analysis and execution engine 120, a builder 122, one or more communication interfaces 124, and one or more input/output (I/O) devices 126. As described in more detail below, the analysis device 110 provides functionality for detecting, quantifying, and mitigating vulnerabilities in software. The functionality provided by the analysis device 110 may also enable generation of an SBOM based on application of reverse-engineering techniques to an application or software product, thereby enabling discovery of the software components used to produce a piece of software or otherwise auditing or authenticating software products.

The one or more processors 112 may include one or more microcontrollers, application specific integrated circuits (ASICs), field programmable gate arrays (FPGAs), central processing units (CPUs) and/or graphics processing units (GPUs) having one or more processing cores, or other circuitry and logic configured to facilitate the operations of the analysis device 110 in accordance with aspects of the present disclosure. The memory 114 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, or other memory devices configured to store data in a persistent or non-persistent state. Software configured to facilitate operations and functionality of the analysis device 110 may be stored in the memory as instructions 116 that, when executed by the one or more processors 112, cause the one or more processors to perform the operations described herein with respect to the analysis device 110, as described in more detail below.

The one or more I/O device 126 may include one or more display devices, a keyboard, a stylus, one or more touchscreens, a mouse, a trackpad, a camera, one or more speakers, haptic feedback devices, or other types of devices. The one or more communication interfaces 124 may be configured to communicatively couple the analysis device 110 to one or more other remote device via one or more networks 130. For example, the analysis device 110 may be communicatively coupled to a computing device 150, which may be a device associated with a user seeking to validate software being installed on or scheduled to be installed on a computing system, such as a subject matter expert, a data scientist, information technology (IT) personnel, a software analyst, or engineer. For example, the user may access the functionality provided by the analysis device 110 via the one or more networks 130 to perform vulnerability testing and analysis or to provide data to the analysis device 110 for vulnerability testing and analysis (e.g., by a third party). It is noted that while aspects of the present disclosure are primarily described with reference to functionality provided by the analysis device 110, the functionality of the analysis device 110 described herein may also be provided via a cloud-based implementation, shown in FIG. 1 as cloud-based analysis device 132. Additionally or alternatively, functionality of the analysis device 110 may be implemented or deployed as an edge platform, an edge fly-away cyber kit, a Software as a Service (SaaS) offering, other implementations and deployments, or a combination thereof.

As illustrated in FIG. 1, the analysis device 110 may also be communicatively coupled to one or more data sources 140. The one or more data sources 140 may include repositories of software code, which may include completed software and/or software in development that are to be tested for vulnerabilities or otherwise analyzed using the analysis device 110 (e.g., to generate an SBOM via reverse engineering techniques disclosed herein). Additionally or alternatively, the one or more data sources 140 may include code libraries storing scripts or other software routines and functions that may be utilized to perform vulnerability analysis in accordance with the present disclosure, as described in more detail below. To expand the capabilities of the analysis device 110, the code libraries may be updated with new scripts, software routines, and the like. The new functionality provided via updating the code libraries may then be integrated into various pipelines and workflows, described in more detail below. Similarly, machine learning and artificial intelligence algorithms may be developed and incorporated into the suite of tools utilized to build pipelines and workflows using the techniques described herein. Such capabilities enable many different types of tools to be rapidly incorporated into the pipelined analysis and workflows provided by the analysis device 110 and enables rapid deployment of new tools as they are developed.

Existing techniques for reverse engineering software rely heavily on subject matter experts. These experts may have custom scripts that they use to analyze software code for vulnerabilities or other features. However, each of these subject matter experts typically works in a silo and the scripts and software each expert develops remains isolated in that expert's silo. As a result, the ability of current systems to detect vulnerabilities is constrained by the number of subject matter experts that can be assigned to work on analysis of a given piece of software code and the amount of time that the subject matter experts are available to analyze the software code under consideration. That is to say, current systems are reliant on the knowledge of the individuals performing the analysis of a piece of software code and the amount of time those individuals are afforded to perform the analysis. It can be appreciated that in such a time constrained system (e.g., a system where the success or ability to detect vulnerabilities is dependent on the amount of time each expert spends on the analysis) vulnerabilities are often missed or overlooked because the subject matter experts performing the analysis did not have sufficient time to perform exhaustive testing and analysis. However, vulnerability analysis, while playing an important role in the software development cycle, is not viewed as requiring an exhaustive analysis in many instances and so, despite utilizing a number of subject matter experts and spending several days or weeks performing vulnerability testing, it is not uncommon in present practice to release software code that has some vulnerabilities (e.g., security vulnerabilities, etc.).

To address the shortcomings of present vulnerability analysis techniques, as described above, the builder 122 provides functionality for designing processing flows or pipelines for analyzing software code for vulnerabilities. The processing flows designed using the builder 122 may integrate vulnerability testing scripts developed by many different subject matter experts and/or testing functionality developed using the analysis device 110 itself to enable streamlined analysis of software code for vulnerabilities or other purposes (e.g., to reverse engineer an SBOM). Exemplary aspects of the functionality provided by the builder 122 are described and illustrated in more detail with reference to FIG. 2.

The analysis and execution engine 120 may be configured to analyze software code using the processing flows and pipelines developed using the builder 122, as described in more detail with reference to FIG. 2. Utilizing the builder 122 and the analysis and execution engine 120 may improve the manner in which software code is analyzed for vulnerabilities. For example, rather than relying on subject matter experts operating in independent silos, the system 100 and the analysis device 110 provide a computing and processing architecture for providing enhanced vulnerability testing that provides more robust and comprehensive detection of vulnerabilities (e.g., detects vulnerabilities that may be missed using prior approaches), enables vulnerabilities to be identified more quickly and with improved scalability as compared to existing approaches. Additionally, the computing and processing architectures provided by the system 100 disclosed herein also enable vulnerability testing to be performed more deterministically, rather than relying on the independent judgment of subject matter experts, thereby providing improved reliability and accuracy with respect to assessing vulnerabilities in software.

Another advantage provided by the system 100 is the ability to utilize reverse engineering techniques to generate reverse SBOMs. The creation of a reverse SBOMs for any software that was not designed with or did not include an SBOM initially, transparency with respect to software is improved and may further enhance vulnerability analysis. For example, a reverse SBOM generated in accordance with the present disclosure can be used as a basis to track subsequent changes in the corresponding software, which may minimize the amount of code that needs to be analyzed for vulnerabilities since only new or modified portions of the software may require analysis, where the new or modified portions may be determined based on changes or updates to the reverse SBOM. Additionally, the system 100 may also provide functionality to operate as an SBOM validator. For example, using the techniques described herein, a binary associated with an SBOM may be analyzed using the reverse engineering and pipeline techniques described herein to verify the components identified in an SBOM. The system 100 may produce confidence information that identifies a confidence level with respect to the information included in the SBOM and may be used to confirm the contents of a binary based on information extracted from the binary itself, rather than merely relying on a developer's statement of what is in the binary based on the SBOM. Exemplary details regarding the above-described benefits and functionality are described in more detail below.

Figure 2:
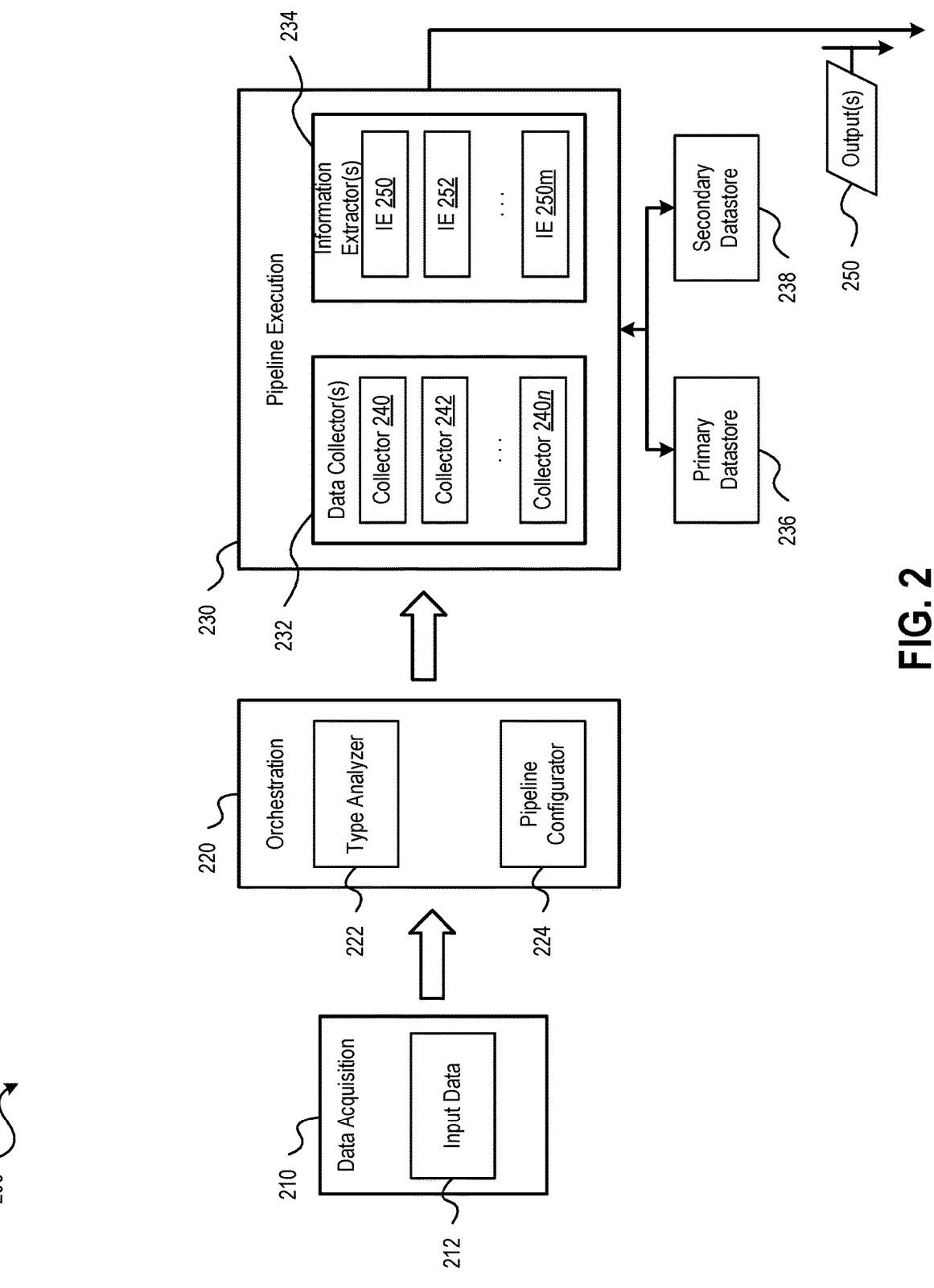
FIG. 2 is a block diagram illustrating an exemplary computing or processing architecture for performing security vulnerability analysis in accordance with aspects of the present disclosure.

To illustrate the concepts introduced above and referring to FIG. 2, a block diagram illustrating an exemplary computing or processing architecture for performing security vulnerability analysis in accordance with aspects of the present disclosure is shown as a vulnerability testing architecture 200. It is noted that the exemplary vulnerability testing architecture 200 may be designed using functionality provided by a builder, such as the builder 122 of FIG. 1. Once the vulnerability testing architecture 200 is designed, the architecture may be utilized to execute vulnerability testing as described herein, which may be performed via functionality provided by analysis and execution engine 120 of FIG. 1.

As conceptually shown in FIG. 2 and described in more detail below, the vulnerability testing architecture 200 may be designed to perform processing in 3 phases: (1) a data acquisition phase 210; (2) an orchestration phase 220; and (3) a pipeline execution phase 230. During the data acquisition phase 210 input data 212 may be obtained. The input data 212 may include applications, malware, and/or firmware, which may be obtained in executable or ".exe" format, a portable executable (PE) format, an executable and linkable file (ELF) format, a Mach-O format, or other type of file format. The input data 212 may additionally or alternatively include log files, packet capture (PCAP) data, steganography data, image data, or other forms of data. The input data 212 may also include information regarding one or more technology targets, such as a type of computing architecture or system to be considered during the vulnerability assessment. Exemplary technology targets may include Internet connected devices (e.g., Internet of Things (IoT) devices, small office home office (SOHO) network environments, enterprise network appliances, mobile computing environments (e.g., Android® devices or compatible systems, iOS® devices or compatible systems, and the like), or other types of technology targets. In an aspect, the input data 212 may include information identifying multiple technology targets or computing platforms/architectures to be considered during vulnerability assessment.

In an aspect, the input data 212 may be obtained in a binary file format, such as an executable file (e.g., a ".exe" file or other file type associated with executable software code). Such a binary file format may be referred to herein as an "unknown binary", meaning that the binary file is not accompanied by an SBOM and/or the actual software code (e.g., code written in a programming language such as C++, Python, etc. that may be compiled to produce the binary file). Because the SBOM and software code are not available during analysis of such a file, the complexity of the vulnerability analysis is significantly greater due to the unknown contents of the unknown binary as compared to knowing the contents of the application via the SBOM and/or having the ability to analyze the software code in a programming language format, which is more easily interpretable than an unknown binary. The input data 212 may additionally or alternatively include binary images, device firmware, suspected malware, media files, or other data suitable for vulnerability analysis in accordance with aspects of the present disclosure, which may also be of an unknown nature (i.e., no accompanying SBOM or data in a format that is easily interpretable by a human).

In an aspect, the input data 212 may be obtained, at least in part, from a data source, such as the one or more data sources 140 of FIG. 1. The data source(s) may include one or more software developers (e.g., an entity that created the software undergoing analysis; entities that created portions of the software undergoing analysis, such as different entities that wrote pieces of independent software code incorporated into a software package; and the like), third parties (e.g., with respect to the software developer and/or the entity performing the testing), sources of known malicious software code (e.g., malware, spyware, etc.), a library (e.g., a database of software binaries previously analyzed using the techniques disclosed herein), or other sources.

In an aspect, data obtained using the techniques described herein may be utilized to create one or more libraries that may be used to detect vulnerabilities or malicious code. The one or more libraries may be stored in a database (e.g., the one or more databases 118 of FIG. 1) and may be utilized by various tools and techniques described herein to identify vulnerabilities and malicious code during analysis of binaries. It is noted that as the information included in the one or more libraries may grow over time and as the library grows, the techniques disclosed herein may become more accurate and/or efficient with respect to detection of vulnerabilities or malicious code. For example, as described herein, data collectors and extractors may provide functionality for generating fingerprints that may facilitate detection of vulnerabilities or malicious code. The system may be able to more quickly and efficiently identify, or confirm the presence of, vulnerabilities and malicious code as the number of fingerprints corresponding to detectable vulnerabilities and malicious code grows.

The orchestration phase 220 provides functionality for performing preliminary analysis and initialization of the pipeline execution phase 230. As illustrated in FIG. 2, the orchestration phase 220 may include a type analyzer 222 and an pipeline configurator 224. The type analyzer 222 may be configured to triage the input data 212 to identify one or more types of data included in the input data 212. To illustrate, the type analyzer 222 may provide functionality to detect whether the input data 212 includes a binary file, media content (e.g., one or more pieces of image content, video content, and/or audio content), one or more technology targets associated with the input data 212, or other characteristics of the input data 212. The pipeline configurator 224 may be configured to initialize one or more pipelines of the pipeline execution phase 230 based on the type(s) identified within the input data 212 by the type analyzer 222. For example, the pipeline execution phase 230 may be configured with various pipelined processes, shown in FIG. 2 as data collectors 232 and information extractors 234, for analyzing the input data 212 for vulnerabilities. As described in more detail below, the different pipelined processes provided by the pipeline execution phase 230 may be associated with different pipelined processes or workflows for different types of input data 212 and/or for performing different types of analysis on the different types of input data. Accordingly, the type analyzer 222 may determine one or more types of data included in the input data 212 and the pipeline configurator 224 may then initialize appropriate pipelines for analyzing the input data 212 based on the different types of data. Exemplary aspects of the types of data that may be detected or determined by the type analyzer 222 and the pipelines configured by the pipeline configurator 224 are described in more detail below.

Before describing operations of the pipeline execution phase 230 in detail, it is important to note that many existing vulnerability detection techniques and tools merely scan the binary searching for signatures (e.g., patterns of bits) corresponding to known threats. However, such techniques are insufficient to identify many types of vulnerabilities that require a deeper understanding of what the binary represents or specific pieces within the binary mean (i.e., require an understanding of information extracted from the binary rather than simply the data of the binary itself). For example, malware can be polymorphic and change itself in an to attempt to evade detection. Additionally, a malicious actor may write code (e.g., in a programming or scripting language) and use a binary diversity engine to produce multiple executable artifacts from the same set of code. The multiple executable artifacts may appear different when viewed in a binary form but may produce the same effects on a target machine (i.e., a device infected by the malware) since the different executable artifacts are derived from the same code. These types of detection-evading threats and others are frequently developed by advanced persistent threat actors, such as nation states, and simple signature matching techniques based on the binary data are not sophisticated enough to detect such vulnerabilities.

Because such vulnerabilities are difficult to detect using simple signature matching, presently used techniques rely on analysis by subject matter experts who have developed a knack or ability to detect these more sophisticated vulnerabilities based on years of experience in the field. However, this approach may be insufficient in detecting sophisticated, detection-evading vulnerabilities for a variety of reasons, resulting in such vulnerabilities going undetected. For example, given enough time and manpower (i.e., enough subject matter experts with the appropriate skills and experience) these more sophisticated vulnerabilities may be detected more frequently, but many would still go undetected since such techniques are subjective in nature and rely heavily on the intuition of the subject matter experts performing the analysis. However, unlimited time and manpower is often not an option, which only serves to compound the frequency with which vulnerabilities are missed using existing approaches. Also, the detection evading techniques may change frequently, making it difficult to detect such vulnerabilities due to differences in the detection-evading techniques at a particular point in time. That is to say, the creators of detection-evading vulnerabilities are a step-ahead and the subject matter experts must play catchup to learn how to identify emerging vulnerabilities and threats, which creates a window of time where such vulnerabilities may proliferate and identification of ways to detect such emerging threats may not be learned until after one or more successful attacks have occurred. Additionally, some existing vulnerability detection tools utilize behavioral analysis to detect vulnerabilities. For example, it may be known that a particular piece of malicious software does certain things on a target device and if that behavior is detected on a particular device, it may be determined that the vulnerability associated with the detected behavior is present on the particular device. However, this behavioral analysis technique, while perhaps more deterministic than relying on a subject matter expert, still suffers from the reactionary problem mentioned above (e.g., because the behavior may not be detected or known until after one or more devices has been successfully attacked via a previously unnoticed vulnerability).

In contrast to the exemplary prior approaches to vulnerability detection described above, the pipeline execution phase 230 may utilize the data collectors 232 and information extractors 234 to analyze the input data 212 and quantify or identify any vulnerabilities identified within the input data 212. More particularly, the functionality provided by the data collectors 232 and the information extractors 234 may utilize fuzzy-matching and other quantification techniques to indicate the presence of one or more vulnerabilities or the probability that a vulnerability is present, as described in more detail below. It is noted that the terms "data" and "information" have different meanings in the discussion that follows. In particular, the term "data" is used to refer to all or portions of the input data 212 having an unknown meaning, while the term "information" is used to refer to meaningful data, such as a precise portion of the input data 212 from which meaning may be derived, inferred, or otherwise ascertained, such as a portion of the input data 212 from which a vulnerability may be identified. Stated another way, "information" refers to specific portions of the input data 212 from which vulnerabilities may be detected, while "data" is used to generally refer to the input data 212 from which "information" may be extracted. As can be appreciated from the distinction between the terms "data" and "information" explained above, the data collectors 232 may be configured to generate data based on the input data 212, while the information extractors 234 may be configured to identify vulnerabilities based on precise elements or pieces of information extracted from within the data generated by the data collectors 232.

The pipeline execution phase 230 may be configured with multiple data collectors 232, shown as including data collectors 240-240$n$, and each data collector may be configured to process different types of input data 212. To illustrate, suppose that the type analyzer 222 determined the input data 212 included a binary input (e.g., an unknown binary) for an application. Such an application may have a variety of functions that may be executed to provide a desired functionality of the application. In such an instance, the pipeline configurator 234 may initialize at least one pipeline having one or more data collectors configured to analyze the binary input.

Figures 3A, 3B:
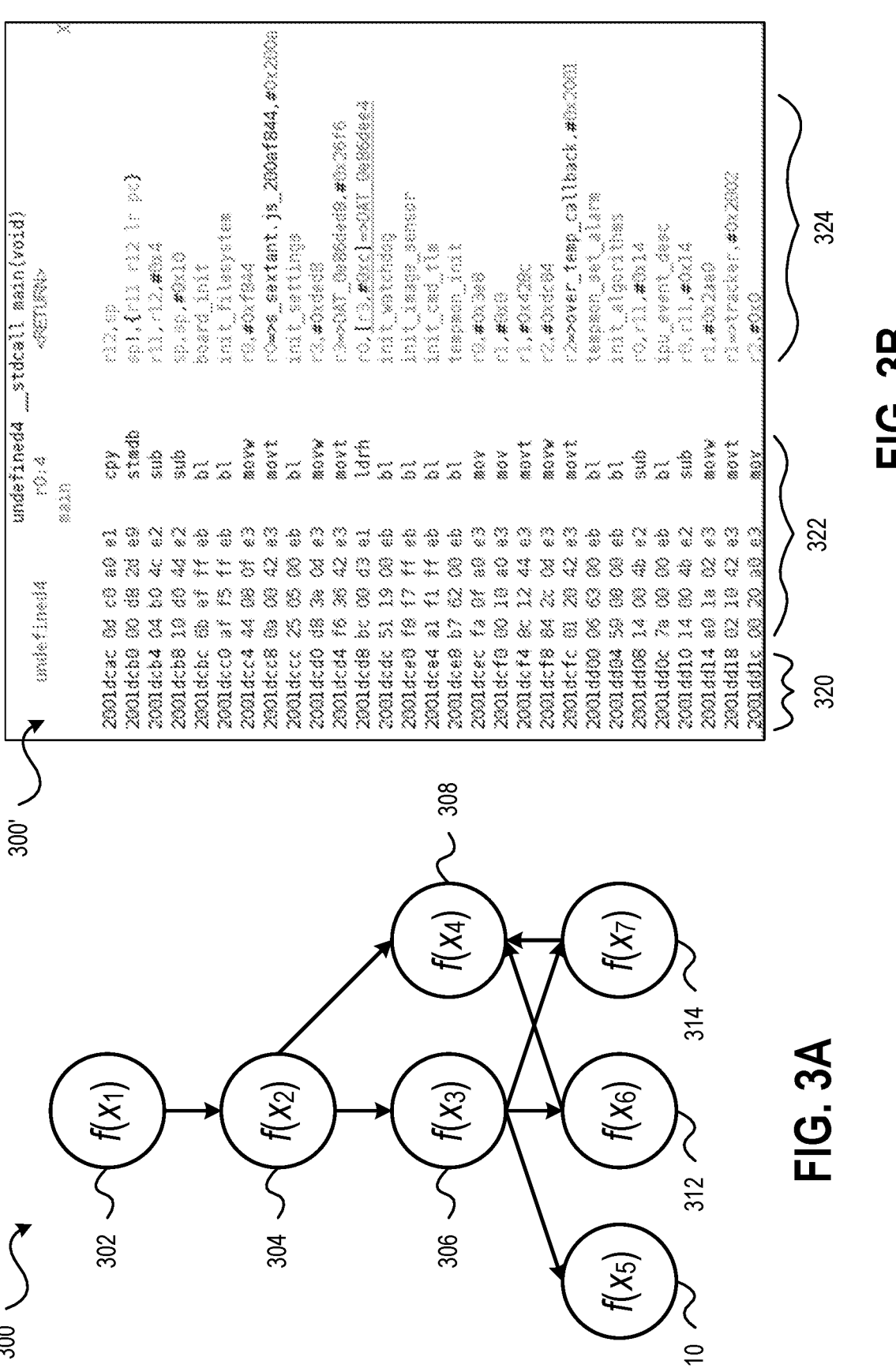
FIG. 3A is a block diagram illustrating an exemplary function call graph that may be utilized to analyze an unknown binary in accordance with aspects of the present disclosure.
FIG. 3B is a screenshot of exemplary disassembly data that may be utilized in processes to detect vulnerabilities in accordance with aspects of the present disclosure.

By way of non-limiting example, the initialized pipeline may include a data collector having one or more disassemblers configured to convert the binary file into a format suitable for use in vulnerability analysis and detection. Referring briefly to FIGS. 3A and 3B, exemplary operations of a data collector for processing a binary input in accordance with aspects of the present disclosure are shown, where FIG. 3A is a block diagram of dependencies between functions of an application represented by a binary input, shown as dependency diagram 300, and FIG. 3B is diagram showing a disassembly output for the binary input data, shown as disassembly output 300'. In particular, the function diagram 300 of FIG. 3A illustrates that the application represented by the binary input may include a plurality of functions 302-314. It is noted that the exemplary functions shown in FIG. 3A are provided for purposes of illustration, rather than by way of limitation and that applications represented by binary inputs may include significantly more functions and dependencies than are shown in FIG. 3A. The functions 302-314 may be associated with a set of dependencies (shown as arrows in FIG. 3A) that indicate relationships between each of the functions. For example, function 304 is shown as depending from function 302 and function 306 is shown as being dependent from function 304. Such dependency relationships indicate that function 302 can call function 304 and function 304 can call function 306. It is noted that a function may have multiple dependencies (i.e., be called by multiple functions). For example, function 308 is shown as being dependent from functions 304, 312, and 314, meaning that function 308 can be called by each of the different functions from which it depends.

In FIG. 3B, the output 300' shows an output that may be generated by a data collector configured to perform disassembly of the binary input. In particular, the output 300' illustrates that the disassembly functionality provided by the data collector may be configured to convert the binary input into memory address spaces 320, assembly instructions 322 (e.g., for specific architecture or technology target), and registers and symbol or function names 324, where "r" numbers (e.g., r0, r1, r2, r3, r4, r11, r12, etc.) are registers and the functions are represented as strings of characters (e.g., board_init, init_filesystem, init_setting, init_watchdog, init_image_sensor, etc.). As can be appreciated from the exemplary output 300' shown in FIG. 3B, by utilizing the type analyzer 222 of FIG. 2 to identify one or more types of data included in the input data (e.g., the input data 212 of FIG. 2), the pipeline configurator 224 may be enabled to initialize processing of the input data using data collectors providing appropriate functionality to generate new representations of the input data that may be more suitable for use in vulnerability analysis as compared to many prior vulnerability detection techniques, as described in more detail below.

Referring back to FIG. 2, the data collectors 232 may be configured to write their outputs (e.g., the disassembly data of FIG. 3B) to a database. For example, in FIG. 2 a primary datastore 236 and a secondary datastore 238 are shown. In an aspect, the primary data store 236 and the secondary datastore 238 may be part of the one or more databases 118 of FIG. 1. The primary datastore 236 may be utilized to store one or more datasets or data lakes containing data generated by the data collectors 232 via processing of the input data 212 and/or outputs of one or more other data collectors within a pipeline or workflow. For example, the disassembly data described above with reference to FIG. 3B may be stored at the primary datastore 236 and a subsequent data collector in the pipeline may be configured to generate a function call graph, which may represent the dependencies shown in function diagram 300 of FIG. 3A. The function call graph may provide additional data describing the input data 212, such as to identify an order in which function calls are made, which may be used to detect vulnerabilities, as described in more detail below. The function call graph may be stored to the primary datastore 236 for subsequent use by another data collector and/or one of the information extractors 234.

Continuing with the examples above, another data collector in the configured pipeline or another pipeline may be configured to generate an image based on the function call graph data stored in the primary datastore 236. For example, the contents of the function call graph, which may include strings representing the function names (e.g., as described above with reference to FIG. 3B), may be converted to a two-dimensional array where each character in the strings of each function is represented as a set of bits or bytes (e.g., depending on the technology target since different encoding standards use different numbers of bits or bytes for encoding characters). The two-dimensional array may be constrained to a particular dimension or size, such as to constrain the two-dimensional array to be x bits or bytes wide. In an aspect, the height or y dimension of the array may not be constrained to accommodate all string data. As a non-limiting example, suppose the string data of the function call graph, when converted to binary (using Unicode) was 01000010 01101001 01100111 01000010 01100101 01100001 01110010 00101110 01100001 01101001. Based on this binary representation of the string data representing the function call graph, the two-dimensional array would be as shown in Table 1 below, with the last for bits (e.g., "0, 0, 0, 0") being padding to complete the array:

TABLE 1

| | | | | | |
|---|---|---|---|---|---|
| 0 | 1 | 0 | 0 | 0 | 0 |
| 1 | 0 | 0 | 1 | 1 | 0 |
| 1 | 0 | 0 | 1 | 0 | 1 |
| 1 | 0 | 0 | 1 | 1 | 1 |
| 0 | 1 | 0 | 0 | 0 | 0 |
| 1 | 0 | 0 | 1 | 1 | 0 |
| 0 | 1 | 0 | 1 | 0 | 1 |
| 1 | 0 | 0 | 0 | 0 | 1 |
| 0 | 1 | 1 | 1 | 0 | 0 |
| 1 | 0 | 0 | 0 | 1 | 0 |
| 1 | 1 | 1 | 0 | 0 | 1 |
| 1 | 0 | 0 | 0 | 0 | 1 |
| 0 | 1 | 1 | 0 | 1 | 0 |
| 0 | 1 | 0 | 0 | 0 | 0 |

Figure 5:
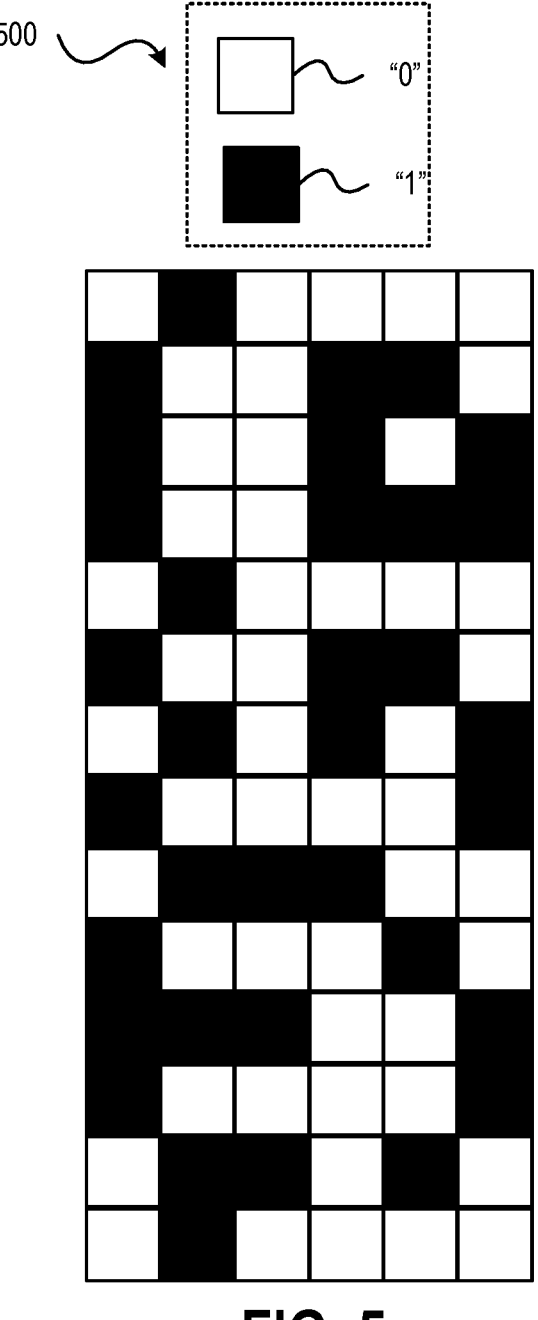
FIG. 5 is a block diagram illustrating another exemplary form of data that may be generated by pipelines utilized to detect vulnerabilities in accordance with aspects of the present disclosure.

Converting the array shown in Table 1 to a binary image may result in the binary image shown in FIG. 5. It is noted that the binary image shown in FIG. 5 based on the example binary data in Table 1 above represents "1" as a black square or pixel and "0" as a white square, as indicated in legend 500, but such image configuration could be modified so that "1" as a white square or pixel and "0" as a black square if desired. Additionally, it is noted that the white squares are outlined in the binary image of FIG. 5 for purposes of highlighting the squares corresponding to each bit of binary data in Table 1, but that the white squares need not be outlined in practice. Furthermore, it is noted that the exemplary binary data of Table 1 and the binary image of FIG. 5 have been provided for purposes of illustration, rather than by way of limitation and that actual binary images may be more complex and have different dimensions than those shown in FIG. 5 and Table 1. The two-dimensional array representing the function calls, as well as the binary image representing the function call graph, may be stored to the primary datastore 236 for subsequent use by another data collector and/or one of the information extractors 234 during vulnerability analysis. For example, a binary image of a function call graph may provide insights into the structure of the functions and/or the application represented by the binary input, as well as the order of operations for the functions, which may be analyzed to evaluate whether a structure of the function call graph is similar to structures of function calls associated with known vulnerabilities or vulnerability families.

It is noted that forming binary images based on the input data 212 and/or outputs of other data collectors is not limited to function call graphs. For example, the binary input (i.e., an unknown or partially unknown binary) may itself be converted to a binary image. As another example, the "strings" command of Linux may be used to extract strings from the binary input that may then be converted to binary input or from other types of files, such as object files, and the binary generated from the strings may be used to generate a binary image. In an aspect, data collectors configured to extract strings from the input data 212 and/or outputs of other data collectors may be configured to filter the strings of interest, such as by limiting the string length (e.g., to only extract strings satisfying a minimum string length or maximum string length), or by searching for strings in particular portions of the input data 212 and/or outputs of other data collectors (e.g., initialized or loaded portions of the input data). Other search parameters for configuring extraction of strings from the input data 212 or outputs of other data collectors may also be used.

In an aspect, a data collector configured to generate a binary image may determine whether sufficient data exists to generate the binary image. For example, if a binary input does not have many strings, generating a binary image from the strings may not be useful as the resulting binary image would be too sparse and inferring or extracting information from the image may be of limited or no value. Accordingly, the data collector may determine (e.g., based on a threshold or other metric) whether sufficient data exists to justify generation of a binary image, whether it be based on a function call graph, strings, or other types of data obtained from the input data 212. Where it is determined that sufficient data exists, the data collector may generate the binary image and store the image and the data used to generate the image to the primary datastore 236. Where it is determined that insufficient data exists, the data collector may store the obtained information to the primary datastore 236 and also store information indicating insufficient data was available to generate a binary image for further analysis.

Having described several exemplary data collectors and the functionality that they provide, attention will now be turned to analysis of the data obtained via the data collectors 232 for vulnerability detection by the information extractors 234. As explained above, "information" is used herein to refer to data with meaning, such as data that may signify the presence of a vulnerability or that may be used to draw an inference that a vulnerability is present. As shown in FIG. 2, the information extractors 234 may include a plurality of information extractors 250-250$m$, where m may be the same as or different from n (i.e., the number of data collectors 232). As explained above, the data collectors 232 may be used to process the input data 212 and generate various kinds of intermediate representations of the input data 212 (e.g., disassembly data, function call graphs, binary images, strings data, and other forms of data). The information extractors 234 may be configured to utilize all or portions of the data generated by one or more of the data collectors 232 to perform vulnerability analysis. Exemplary functionality provided by information extractors in accordance with aspects of the present disclosure are described in more detail below.

It is noted that the information extractors 234 may also utilize other types of data (i.e., data not derived or obtained from the input data 212) to perform portions of the vulnerability analysis. For example, information associated with known vulnerabilities or families of vulnerabilities (e.g., different generations or versions of a particular vulnerability) may be stored in a database (e.g., the one or more databases 118 of FIG. 1, the primary datastore 236, or the secondary datastore 238). The information associated with known vulnerabilities or families of vulnerabilities may include structural data associated with known vulnerabilities or families of vulnerabilities (e.g., function call graphs, keywords or strings, image data, or other types of data obtained from known vulnerabilities). This additional known vulnerability data may be utilized by some information extractors to analyze the data generated by the data collectors and to detect vulnerabilities in the input data 212, as described in more detail below.

By way of non-limiting example, information extractors 234 may be configured to analyze binary images generated by one of the data collectors 232. In an aspect, the binary images may be analyzed by the information extractors 234 using one or more machine learning techniques. For example, the binary images may represent a binary input (e.g., an unknown binary) or strings obtained by a data collector 232, as described above. The binary images may be analyzed using a convolutional neural network of the information extractor. The convolutional neural network may include one or more convolutional layers, one or more pooling layers, and a fully connected layer. The one or more convolutional layers may be configured to produce a map of activations called a feature map, which may indicate locations and a strength of one or more detected features in an input, such as the binary image described above. For example, the convolutional layer(s) may perform a mathematical operation to the input and return a feature map as an output of that layer. The one or more pooling layers may be configured to down sample the features identified in the feature maps output by the convolutional layer(s), which may be viewed as generating one or more pooled feature maps having reduced dimensions. The pooled feature maps output by the pooling layers may minimize the impact of small variations in the locations of the features in the feature maps, resulting in feature maps that are invariant to small variations or translations in the features identified in the feature maps. It is noted that the pooling layer(s) may include average pooling layers, max pooling layers, or a combination thereof. The fully connected layer may be configured to receive, as input, the outputs of the pooling layer(s) (e.g., the pooled feature maps) and to classify the various features. For example, suppose the fully connected layer includes 4 output neurons, each representing a particular classification that may indicate a likelihood that a particular feature is present (or not present) in the input (i.e., the feature maps). When presented with a given set of input, the fully connected layer may output probabilities associated with each of the 4 classifications (i.e., one for each neuron), where the probabilities represent a likelihood that a particular feature is present. It is noted that the output of the pooling layer(s) may be flattened into a single layer prior to processing via the fully connected layer.

As can be appreciated from the foregoing, configuring an information extractor using a convolutional neural network may enable features associated with the input data 212 to be detected with some level of confidence (i.e., the probabilities), such as particular strings or sequences of strings indicative of a vulnerability or sequences of binary data corresponding to one or more portions of an unknown binary indicative of a vulnerability. Moreover, the lossy nature of convolutional neural networks (e.g., due to the compression provided by the pooling layer(s)) may also mitigate some attempts to obfuscate vulnerabilities, such as by making minor changes to an existing vulnerability.

It is noted that other types of information may also be extracted from data generated by the data collectors 232 using convolutional neural networks, such as to infer features (e.g., a structure, a class of malware, etc.) associated with an application represented by an unknown binary based on a function call graph (or rather a binary image representing the function call graph). It is noted that convolutional neural networks utilized to evaluate different types of features or feature sets may operate in a manner similar to the convolutional neural networks described above, but may vary in terms of the number of convolutional layers, pooling layers, and configuration of the fully connected layer depending on the number of features to be classified by the fully connected layer and the number of features that may be included in the convolutional layer(s) and/or the pooling layer(s).

Information extractor 234 may also include encoder-decoders and autoencoders. For example, an autoencoder may be utilized to attempt to reconstruct a portion of the input data 212 based on data obtained from one or more data collectors. If the input data 212 is normal (i.e., no vulnerabilities), the autoencoder should produce an output that closely approximates the relevant portion(s) of the input data 212 from which the data used for the reconstruction was derived. However, where an anomaly exists in the input data 212, the autoencoder may produce an output that does not closely approximate the relevant portion(s) of the input data 212, which may indicate a potential vulnerability.

As an additional example, an information extractor 234 may be configured to analyze the function call graph and evaluate the order in which function calls are made. If a function call is determined to be performed in an unexpected or abnormal order, then a vulnerability may be predicted to be present. Additionally or alternatively, the function call graph analysis may be configured to identify leaky functions, which may be indicative of a likelihood that a vulnerability is present. The function call graph analysis may also involve comparing the structure of the function call graph to structures associated with known vulnerabilities, such as structures associated with known malware or malware families. In an aspect, the comparison may be performed using cosine similarity. For example, the function call graph may be converted to a vectorized representation, which may be based on term frequency (e.g., the frequency at which various functions are called within the function call graph), features, or other characteristics. Then, cosine similarities may be determined with respect to the vectorized representation of the function call graph obtained by a data collector 232 from the input data 212 and one or more vectorized representations of function call graphs associated with known malware or malware families. The cosine similarities may be specified as values ranging between 0 and 1, where similarity scores closer to or equal to 0 may indicate no match and similarity scores closer to or equal to 1 may indicate a match with a known malware or malware family. Using the approach described above to analyze function call graphs may enable detection of vulnerabilities despite attempts to obfuscate the vulnerability, such as by modifying or altering an existing malware. For example, the cosine similarity scores may indicate similarities between the obfuscated vulnerability and a known vulnerability despite the differences created by the obfuscation. In an aspect, an information extractor 234 may be configured to detect a potential vulnerability based on a similarity score threshold, where a vulnerability is detected or predicted when the cosine similarity score exceeds the threshold. When the threshold is not exceeded the information extractor may determine that no vulnerability is present.

It is noted that cosine similarity may be utilized by information extractors 234 to analyze more than just function call graphs. For example, cosine similarity may be used in information extractors to perform classification. To illustrate, cosine similarity may be utilized to perform clustering of strings (e.g., obtained via a data collector 232), where the cosine similarity is used to assign different strings to various clusters (e.g., via a K-Nearest Neighbor (KNN) clustering algorithm). In such instances, each cluster may represent a different classification, thereby enabling strings to be classified according to which cluster they are assigned.

In addition to the various information extractors 234 described above, which primarily have been described with respect to analysis of a binary input or information obtained from a binary input via the data collectors 232, information extractors may also be provided for analyzing other types of inputs for vulnerabilities. For example, information extractors may be configured to detect data hidden in media, a process referred to as steganography that is known to be used by terrorist networks to relay messages and information. Such an information extractor may be configured to analyze an image to detect whether the image has data hidden inside of it. One such way to perform this analysis is to evaluate an amount of chaos associated with the image (e.g., based on analysis of data associated with pixels of the image, such as binary data corresponding to each pixel). A normal or non-modified image may have more chaos than an image having embedded data (e.g., because hiding data in the image removes some of its chaos). Information extractors configured to detect vulnerabilities in media files may also be configured to analyze metadata or other contents of an image file, such as metadata associated with PNG files, which may contain malicious code.

Some information extractors 234 may be configured to expose data to one or more dashboards or graphical user interfaces (GUIs) (e.g., a GUI presented at a display device associated with the computing device 150 of FIG. 1). For example, where a vulnerability is detected or predicted to be present, the portions of the information analyzed to predict or detect the present of a vulnerability may be presented as outputs 250 at a GUI so that a subject matter expert or data scientists can review the information and make a final determination that the vulnerability is or is not present. In an aspect, when search capabilities are needed with respect to the information presented in the GUIs, the information upon which the vulnerability was predicted may be stored in the secondary datastore 238 and may be exposed to the GUIs via an application programming interface (API), such as the Elastic Rest API. As a non-limiting example, where a vulnerability is detected based on string data, the string data may be stored in the secondary datastore 238 and passed to a GUI via an API to enable a user (e.g., subject matter expert or data scientist) to search the string data.

In an aspect, one or more information extractors 234 may be configured to generate fingerprints associated with known vulnerabilities or malicious code. For example, the fingerprint(s) may be visual representations of certain behaviors noted in the piece of software. Exemplary behaviors that may be represented by fingerprints in accordance with the present disclosure include, but are not limited to: buffer overflows, integer overflows, importing external libraries, hard coded credentials, weak or misused cryptography, and improper error handling. A buffer overflow behavior may be represented by a fingerprint indicative of when a program writes data beyond the boundaries of pre-allocated and fixed length data buffers, which is often associated with known, risky function calls (e.g., strcpy, sprint). Integer overflow behavior may be represented by a fingerprint indicative of when a mathematical operation results in a value that is greater than the maximum value of the date type in which the value is stored (e.g. exceeding maximum size of an integer). This can lead to unspecified behavior that can be exploited. Fingerprints can be developed to seek out mathematical operations and functions lacking a bounds check. Importing external libraries, such as from open source, could introduce additional vulnerabilities to a binary. Fingerprints for detecting this behavior may be built based on a list of imported libraries present in a binary. Hard coded credentials, such as admin passwords, and other 'back doors' are often left in code so that programmers can get in and easily debug and troubleshoot code. Fingerprints may be designed to search for strings indicative of such hardcoded credentials, as could searches for hashed values and other lightly disguised passwords in code. Weak or misused cryptography can lead to exposure of sensitive information and may be detected using fingerprints configured to identify the use of outdated cryptographic libraries, improper use of good libraries, or identifiable patterns in the binary that reveal the use of hard-coded cryptographic keys. Improper error handling can expose information or affect program flow in unexpected ways. Fingerprinting patterns in a binary associated with error handling routines can help locate these in binary data. Additionally, developers and organizations (via coding standards) will develop a 'style' of programming. This style could be fingerprinted for an organization and enable detection of code adhering to or deviating from the organization's style, which may indicate a potential compromise or cybersecurity problem. It is noted that the exemplary behaviors described above have been provided for purposes of illustration, rather than by way of limitation and the other types of fingerprints and behaviors may be incorporated into pipelines and workflows designed in accordance with the present disclosure.

The above-described fingerprint techniques may enable analysis of multiple pieces of software across an enterprise. For example, suppose that a piece of software has a vulnerability exhibiting a behavior represented by a fingerprint. Other pieces of software having the same vulnerability (or different vulnerabilities exhibiting similar behaviors to the vulnerability corresponding to the fingerprint) may exhibit the same or similar behaviors to that of the fingerprint, and identification of multiple pieces of software across an enterprise sharing the same fingerprint may signify the presence of multiple instances of the vulnerability corresponding to the fingerprint or similar vulnerabilities that result in behavior similar to that represented by the fingerprint. The fingerprints may be stored in a database (e.g., the one or more databases 118 of FIG. 1) to create a catalog of vulnerabilities. When analyzing software across an enterprise, the fingerprints of the catalog may be used to detect or confirm the presence of one or more vulnerabilities. In an aspect, an information extractor may be configured to classify detection of a fingerprint as a false positive if the fingerprint is detected in one instance of the software within the enterprise, but not anywhere else within the organization or enterprise. In an aspect, detection of a false positive may also be confirmed using the techniques disclosed herein. For example, a binary associated with a false positive may be analyzed using the data collectors and information extractors described herein to confirm whether the false positive is a true false positive (i.e., no vulnerability or malicious code is present), or if a vulnerability or malicious code is actually present in the software or component thereof.

It is noted that vulnerability analysis processes provided by the data collectors 232 and/or the information extractors 234 may also be used to trigger new pipelines or workflows. For example, suppose that a malware vulnerability is predicted to be present based on analysis of an input binary by an information extractor (e.g., using a convolutional neural network to analyze a binary image of the binary input). Upon predicting a vulnerability is likely present, a pipeline or workflow may be triggered to perform additional types of analysis on the input binary to attempt to confirm the prediction is correct. Such additional analysis may include using function call graph or structural analysis, versioning comparisons, order of precedence analysis using similarity scores, keyword analysis, or other types of analysis to confirm the presence of malware in the input binary and/or identify the malware family/type corresponding to the malware. If the malware family or type is identified, an additional workflow or pipeline may be initiated with data collectors 232 and information extractors 234 configured to analyze that specific malware family or type. In an aspect, such additional pipelines may be initiated even when a particular malware family or type is not specifically identified, such as to initiate a pipeline associated with analyzing a malware family or type that most closely matches characteristics of the malware predicted to be present.

It is to be appreciated that present day vulnerability testing processes experience technical challenges with respect to simply sharing data and information between available vulnerability analysis tools. For example, disassembler tools work well within their own operating environment, but are normally not designed to integrate with other tools that may be used to perform vulnerability analysis and testing. Furthermore, many subject matter experts and data scientists involved in vulnerability analysis and testing have created their own personal and custom scripts and tools, but each such tool is designed to perform a specific task and is not created with integration of that tool with other tools in mind.

To address these challenges the vulnerability testing architecture 200 may define one or more schemas that may be used to coordinate the sharing of information between the data collectors 232 and/or the information extractors 234. For example and as explained above, the input data 212, as well as the data obtained by the data collectors 232 and the information extracted by the information extractors 234 may be stored in the primary datastore 236. One or more schemas may be used to manage the data and information stored in the primary datastore 236 and support interoperability between the various data collectors 232 and the information extractors 234. For example, the schema may define tables for different types of data generated by the data collectors 232 and the information extracted by the information extractors 234. The schema(s) may also provide metadata for linking different pieces of data and information stored in the primary datastore 236 to each other. For example, when a binary image is generated it may be linked, via metadata, to the data or information used to generate the binary image. Similarly, metadata may be used to associated specific portions of the input data 212 (or other data and information generated during analysis of the input data 212) to strings or other data generated from the input data 212, thereby enabling other processes to perform additional processing on those portions of the input data 212 as needed to support operations of the vulnerability testing architecture 200. As a non-limiting example, suppose that strings data obtained from a particular portion of the input data 212 was evaluated and a vulnerability was predicted. Based on that prediction, an additional pipeline or workflow may be initiated and may require a new type of data to be extracted from those portions of the input data 212, which may be achieved based on the metadata linking the strings to particular portions of the input data 212. The schema(s) may also be utilized to enforce standardized data formats for storing data to the primary datastore 236 and include information that enables mapping or conversion of the standardized data formats to tool specific formats, such as if a tool requires binary data to be constrained to certain dimension. The schema(s) may further be used to track multiple different types of input data, such as a binary input, object files, log files, media content, and the like and may maintain metadata to link each different type of input data to the corresponding data and information generated or obtained therefrom by the various data collectors 232 and information extractors 234. It is noted that the exemplary details described above regarding the use schemas to facilitate interoperability between the data collectors 232 and information extractors 234 has been provided for purposes of illustration, rather than by way of limitation and that schemas utilized in accordance with aspects of the present disclosure may utilize additional mechanisms to manage how data is stored (e.g., in the primary data store 236 and the secondary datastore 238) and shared among the various data collectors 232, information extractors 234, and GUIs.

To further illustrate the concepts described above and referring to FIGS. 4A-4D, block diagrams illustrating exemplary pipelines that may be created in accordance with aspects of the present disclosure are shown. It is noted that the exemplary pipelines shown in FIGS. 4A-4D may be designed using a builder tool, such as the builder 122 of FIG. 1. Once designed, the various pipelines illustrated and described below may be utilized as part of a pipeline execution phase (e.g., the pipeline execution phase 230 of FIG. 2) to perform various tasks in connection with analyzing an input dataset for vulnerabilities, as described above with reference to FIGS. 2-3.

Figure 4A:
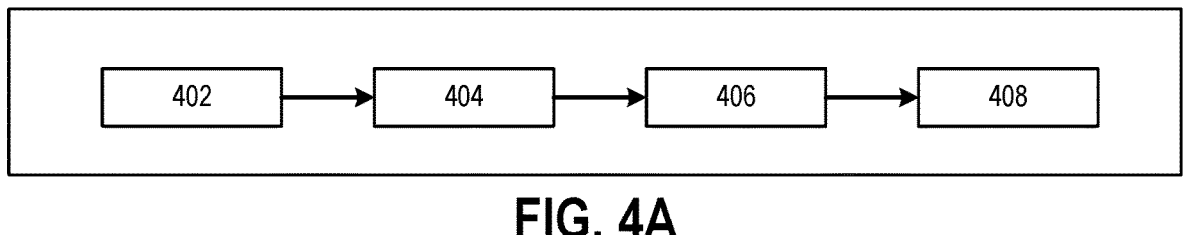
FIGS. 4A-4D are block diagrams illustrating exemplary aspects of designing pipelined processes for analyzing unknown binaries and other types of information in accordance with aspects of the present disclosure.

In FIG. 4A, a pipeline is shown as including processes 402-408. The pipeline of FIG. 4A illustrates a basic pipeline that does not initiate additional pipelines or processes to be performed in parallel. Such pipelines may be suitable for performing specific types of analysis, such as analysis of media content or other forms of vulnerability analysis for which vulnerability detection may not require generation of large amounts of data or different types of data.

Figure 4B:
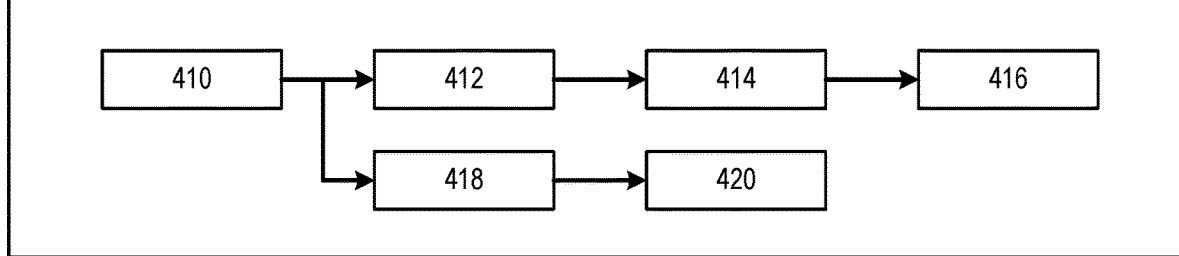

Referring to FIG. 4B, a pipeline is shown as including processes 410-420. Unlike the pipeline of FIG. 4A, the pipeline of FIG. 4B utilizes branching to facilitate additional analysis of an input dataset. For example, process 410, which may be a data collector, may generate data that may be utilized by both processes 412 and 418. For example, the process 410 may be configured to identify certain types of data, such as files and code, within a binary input file. An exemplary tool for performing such tasks is Binwalk. The code data generated by the process 410 may be provided to the process 412, which may be disassembly and debugging tool, such as Radare2 as a non-limiting example. Process 412 may generate disassembly data based on the code data, as described above with reference to FIG. 3 and other types of data depending on the particular analysis to be performed via the pipeline of FIG. 4B. Processes 414, 416 may be additional data collectors and information extractors for performing vulnerability detection based on data generated by the process 412 or other processes. Process 418 performs one or more types of analysis based on strings within the files obtained by the process 410. For example, process 418 may utilize the "strings" Linux command to extract string data from the files. The string data may be utilized by process 420 to determine whether a vulnerability is present in the input data (e.g., using one of the techniques described above or another technique).

Figure 4C:
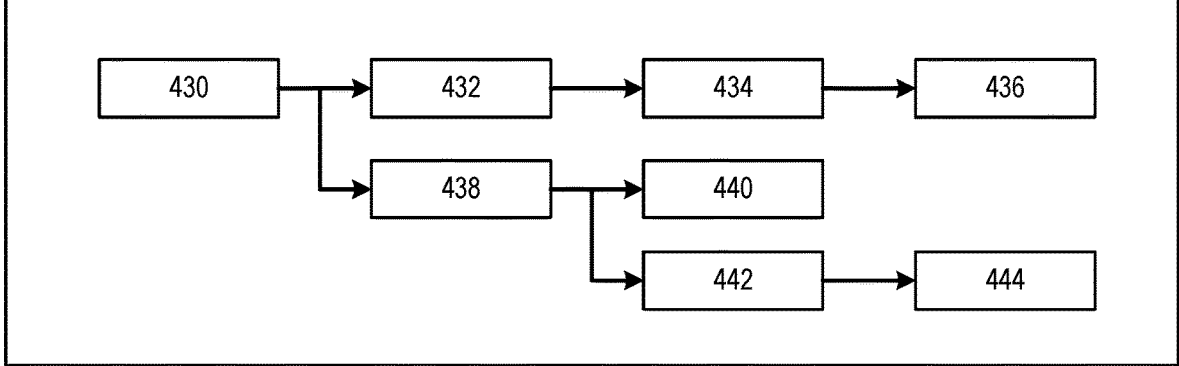

The pipeline of FIG. 4C is shown to include processes 430-444. Similar to FIG. 4B, process 430 may be configured to extract files and code data from a binary input. Processes 432-436 may be similar to processes 414, 416 of FIG. 4B and may represent additional data collectors and information extractors for performing vulnerability detection based on data generated by the process 430 or other processes. Similar to processes 418, 420, the processes 438, 440 may be configured to generate string data from the files obtained by process 430 and analyze the string data to determine whether a vulnerability is present in the input data. Additionally, a process 442 may be initialized based on the strings generated by the process 438. Process 442 may be configured to perform a different type of analysis of the string data than the process 440. For example, process 440 may look for keywords or word sequences within the string data to detect the presence of a vulnerability, such as to detect keywords or word sequences known to be indicative of a vulnerability. In contrast, process 442 may be configured to convert the string data into a binary image that may then be used as an input to process 444, which may be an information extractor configured with a convolutional neural network for analyzing the binary image generated from the string data.

As can be appreciated by comparison of FIGS. 4A-4C, aspects of the present disclosure may enable rapid development of robust pipelines for automating and streamlining vulnerability analysis. For example, FIG. 4A is a basic workflow suitable for performing vulnerability analysis with a singular focus with respect to the types of vulnerability detection methods that are utilized. Using the builder, a subject matter expert, data scientist, or other individual may expand upon the simple process of FIG. 4A to create a more robust vulnerability analysis pipeline, such as by incorporating data collectors and information extractors for performing additional types of vulnerability analysis, such as string analysis. The builder may further be used to expand upon the pipeline of FIG. 4B by incorporating additional types of vulnerability analysis based on string data. It is noted that the exemplary pipelines of FIGS. 4A-4C have been described for purposes of illustration, rather than by way of limitation and that more complex pipelines may be created using the builder and the concepts described herein.

Figure 4D:
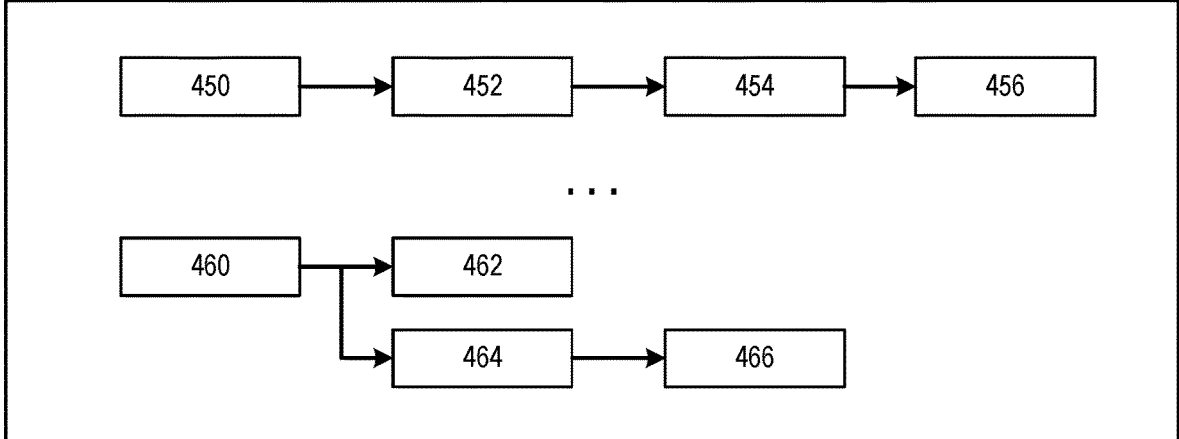

Referring to FIG. 4D, a pipeline having processes 450-456 and a pipeline having processes 460-466 are shown. As illustrated in FIG. 4D, a builder tool in accordance with the present disclosure may facilitate creation of pipelines capable of performing vulnerability analysis processing in parallel. For example and as explained above with reference to the type analyzer 222 and the pipeline configurator 224, a vulnerability analysis process in accordance with the present disclosure may be performed using multiple pipelines operating in parallel. It is noted that while FIG. 4D shows two pipelines operating in parallel to perform vulnerability analysis on an input dataset, the builder functionality may enable any number of pipelines to be designed for parallel processing, which may enable vulnerability testing to be performed more rapidly, thereby increasing the likelihood that more vulnerabilities will be detected as compared to prior techniques. Furthermore, it is to be appreciated that while multiple pipelines may be operating in parallel, the different pipelines may share data and information via a primary datastore (e.g., the primary datastore 236 of FIG. 2) as described above. Thus, the separate and distinct pipelines may operate in parallel, the multiple different pipelines are not siloed, which is an advantage as compared to many previous vulnerability analysis tools and approaches.

Referring back to FIG. 1 and as can be appreciated from the description of FIGS. 2-5 above, the functionality provided by the analysis device 110 for performing vulnerability analysis provides several improvements over prior approaches and tools. For example, rather than relying on subjective assessments of subject matter experts and data scientists, the analysis device 110 and the builder 122 in particular, enable automation of vulnerability analysis processes through construction of pipelines providing robust capabilities for extracting data from an input dataset using data collectors and then identifying meaningful pieces of data (i.e., information) that may be used to detect, identify, and/or predict whether a vulnerability is present in the input data. As explained above, the pipelines may be configured to facilitate analysis of many different types of content, including unknown binaries, images and other media content, strings, function call graphs, order of operations, binary data, binary images, keywords or word sequences, and other types of content that may be generated or extracted from the input dataset. Additionally, the information extractors utilized by the pipelines may be operated in parallel and may automatically execute new pipelines or workflows to facilitate faster vulnerability analysis as compared to the individualistic and siloed nature of existing vulnerability processes. Another advantage provided by the functionality of the computing device 110 is the ability to utilize fuzzy-matching techniques, such as cosine similarity, clustering, convolutional neural networks, and other techniques, which may aid in detection of detection-evading vulnerabilities.

In addition to the various improvements and advantages described above, the functionality provided by the analysis device 110 may also enable generation of a reverse SBOM for an unknown binary or a partially unknown binary (e.g., a binary for which an SBOM may exist, but is incomplete). In particular, the functionality provided by the analysis device 110, which leverages reverse engineering techniques and pipelined processes, may be used to reconstruct an SBOM for a binary that is unaccompanied by its source code and documentation. For example, using data collectors and information extractors, such as disassemblers, debuggers, static and dynamic analysis, and other techniques, the analysis device 110 may extract and analyze data from the binary that may be used by the analysis device 110 to characterize the structure of the binary and identify its components and dependencies. The reverse SBOM may contain a software inventory that lists all identifiable components included in the binary and any known, discoverable metadata including version, and license information. The reverse SBOM may also include information regarding component details. To illustrate, binaries are often comprised of a hierarchy of binary objects or sub-component binaries, which may be mapped out and processed through a binary analysis workflow to provide more detailed information about each software component, including origin, dependencies, and other relevant information that can be identified. The analysis device 110 may also utilize publicly available sources of information, such as databases of software components or common vulnerabilities and exposures (CVE), to identify the components and their licensing information and associate them with known vulnerabilities. Such additional information may also be incorporated into the reverse SBOM.

It is noted that the data collectors (e.g., the data collectors 232 of FIG. 2) and information extractors (e.g., the data collectors 234 of FIG. 2) described herein may provide robust functionality for obtaining information that may be utilized to generate reverse SBOMs. For example, if versioning information is not available based on information obtained by a particular data collector, another data collector or information extractor may be capable of capturing such information from the binary or from the output of a previously applied data collector. The diverse types of analysis for a given pipeline may enable the appropriate information for generating a reverse SBOM to be obtained from a binary with confidence that the information is accurate.

It is noted that a reverse SBOM generated by the analysis device 110 may be incomplete or inaccurate, at least for some details. However, that is to be expected when utilizing reverse engineering techniques, which are by their very nature lossy. Nevertheless, even an incomplete SBOM can provide valuable information by highlighting potential security risks and enabling organizations to take appropriate measures to manage those risks. Additionally, the reverse engineering capabilities will improve as the system 100 matures, enabling the reverse SBOM generation process to become more and more accurate over time. As can be appreciated from the above, the concept of a reverse SBOM offers a promising solution for generating accurate and detailed SBOMs for software binaries that lack source code and documentation. The reverse SBOM approach described above may also be used to automate the process of generating an SBOM while maintaining high levels of security and compatibility, such as by integrating the functionality described above into DevOps and enrichment pipelines. This would provide additional valuable insights into the software components and associated security and compliance risks. In view of the above, it is to be appreciated that the reverse SBOM approach represents an important step forward in software supply chain security and compliance, and it provides a powerful new tool for managing the growing complexities and risks of modern software systems.

As can be appreciated from the description of FIGS. 1-5 above, the system 100 and more particularly, the functionality provided by the analysis device 110, provides several improvements in the field of vulnerability assessment and analysis. For example, the analysis device 110 provides a modular system providing a lightweight communication framework and clearly defined interfaces to allow it to be easily integrated into existing workflows and pipelines without requiring significant changes to the underlying system. Additionally, the analysis device 110 and its modular architecture support scalability by using modules that can handle large volumes of binary code, deployed on an elastic infrastructure that can scale to support increasing demand and volume. The analysis device 110 is also purposefully designed to support automation, especially for time consuming and error prone tasks (e.g., reverse engineering tasks) and can also support automation of many complex tasks, thereby requiring minimal intervention by data scientists of subject matter experts as compared to existing approached. Another advantage is the flexibility the analysis device 110 provides, such as enabling rapid development of pipelines and workflows, integration of new tools into pipeline and workflow streams, and enabling customizable configuration settings to handle new input and output formats, which enables the analysis device 110 to be highly adaptable to changing requirements and environments.

Referring to FIG. 6, a flow diagram of an exemplary method for analyzing an input dataset in accordance with aspects of the present disclosure is shown as a method 600. In an aspect, the method 600 may be performed by a computing device, such as the analysis device 110 of FIG. 1, or may be performed via other deployment and implementation configurations capable of performing the operations and steps of the method 600 (e.g., a cloud-based analysis device, a SaaS implementation, an edge deployment, etc.). Steps of the method 600 may be stored as instructions (e.g., the memory 114 of FIG. 1) that, when executed by one or more processors (e.g., the one or more processors 112 of FIG. 1), cause the one or more processors to perform operations of the method for analyzing data in accordance with the concepts disclosed herein.

At step 610, the method 600 includes receiving an input dataset comprising at least an unknown binary. It is noted that in some aspects the input dataset may include other types of data and may not include an unknown binary.

Furthermore, it is noted that the unknown binary may be a partially unknown binary (e.g., a binary for which a partial SBOM is available).

At step 620, the method 600 includes initializing, by the one or more processors, one or more pipelines configured to analyze the unknown binary. As explained above with reference to FIGS. 2 and 4A-4D, each pipeline of the one or more pipelines may include at least one data collector and at least one information extractor.

At step 630, the method 600 includes generating, via one or more data collectors of a first pipeline of the one or more pipelines, data based on the unknown binary. As explained above with reference to FIGS. 2-5, the data generated by the data collector(s) may include an intermediate representation of at least a portion of the unknown binary, such as strings data, binary images, function call graphs, disassembly data, or other intermediate representations.

At step 640, the method 600 includes determining, via the at least one information extractor of the first pipeline, whether a vulnerability is present in the unknown binary based on information extracted from the data generated by the one or more data collectors of the first pipeline. As explained above with reference to FIGS. 2-5, the information extractors may utilize various processes (e.g., convolutional neural networks, cosine similarity, clustering, structural analysis, keyword analysis, and other techniques) to detect vulnerabilities. Such processes may be designed to find portions of the data that carry meaning from which a determination regarding whether a vulnerability exists may be made. In an aspect, the information extractors may also be configured to output at least a portion of the information extracted from the data generated by the one or more data collectors to a graphical user interface, as described above. The graphical user interface may provide interactive elements that enable additional analysis to be performed in connection with detection of vulnerabilities present in the unknown binary or other types of analysis.

In an aspect, the method 600 may also include, at step 650, generating a reverse SBOM for the unknown binary based on the data generated by the one or more data collectors, the information extracted from the data generated by the one or more data collectors by the at least one information extractor, or a combination thereof. As explained above, the reverse SBOM may include information associated with vulnerabilities determined to be present in the unknown binary, software components associated with the unknown binary, dependencies between the software components, license information associated with the software components, risk assessment information associated with the unknown binary, or a combination thereof, where such information may be derived from the data and information generated by the data collectors and/or the information extractors.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-6) may comprise processors, electronics devices, hardware devices, electronics components, logical circuits, memories, software codes, firmware codes, etc., or any combination thereof. In addition, features discussed herein relating to FIGS. 1-6 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIG. 6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   receiving, by one or more processors, an input dataset comprising at least an unknown binary, wherein the unknown binary is associated with unknown or incomplete source code, documentation, software bill of material (SBOM), or any combination thereof;

identifying, by the one or more processors, at least one feature associated with the unknown binary, wherein the at least one feature comprises at least a type of data of the input dataset;

initializing, based on at least the type of data and by the one or more processors, one or more pipelines configured to detect vulnerabilities within the unknown binary based on the at least one feature, wherein each pipeline of the one or more pipelines comprises at least one data collector executable by the one or more processors and at least one information extractor executable by the one or more processors;

generating, via one or more data collectors of a first pipeline of the one or more pipelines, data based on the unknown binary, wherein the data comprises a first intermediate representation of at least a portion of the unknown binary;

determining, via the at least one information extractor of the first pipeline, whether a vulnerability is present in the unknown binary based on a similarity between one or more characteristics of information extracted from the data generated by the one or more data collectors of the first pipeline and information associated with at least one known vulnerability; and generating a reverse software bill of materials for the unknown binary based on the data generated by the one or more data collectors, the information extracted from the data generated by the one or more data collectors by the at least one information extractor, or a combination thereof, wherein the reverse software bill of materials comprises information associated with vulnerabilities determined to be present in the unknown binary, software components associated with the unknown binary, dependencies between the software components, license information associated with the software components, risk assessment information associated with the unknown binary, or a combination thereof.

2. The method of claim 1, wherein the one or more information extractors are configured to process a binary image generated based the first intermediate representation of at least the portion of the unknown binary using a convolutional neural network, wherein the convolutional neural network is configured to output a set of probabilities that indicate a likelihood that each of a plurality of vulnerabilities are present in the unknown binary, and wherein a presence of a vulnerability within the unknown binary is determined based on the set of probabilities.

3. The method of claim 2, wherein the first intermediate representation comprises a function call graph or string data generated by the one or more data collectors.

4. The method of claim 1, wherein the at least one feature comprises a type associated with contents of the input dataset, wherein the initializing the one or more pipelines comprises initializing a plurality of pipelines, the plurality of pipelines comprising the first pipeline and a second pipeline, and wherein the second pipeline comprises one or more second data collectors and one or more second information extractors configured to analyze content associated with at least one type associated with content of the input dataset corresponding to the at least one feature.

5. The method of claim 4, wherein the one or more second data collectors of the second pipeline are configured to generate second data comprising a second intermediate representation for the unknown binary, wherein the second intermediate representation is different from the first intermediate representation, and wherein the one or more second information extractors are configured to determine whether a vulnerability is present in the unknown binary based on information extracted from the second intermediate representation.

6. The method of claim 5, wherein the first pipeline and the second pipeline operate in parallel.

7. The method of claim 5, wherein a third pipeline is initialized based on an output a particular data collector of the first pipeline or the second pipeline or based on an output of a particular information extractor of the first pipeline or the second pipeline.

8. The method of claim 1, further comprising:

comparing, by the one or more information extractors of the first pipeline, characteristics of the information extracted from the data generated by the one or more data collectors of the first pipeline to information associated with at least one known vulnerability; and determining, by the one or more information extractors of the first pipeline, a similarity between the characteristics and the information associated with at least one known vulnerability, wherein a presence of a vulnerability in the unknown binary is determined based on the similarity.

9. The method of claim 1, further comprising outputting, to a graphical user interface, at least a portion of the information extracted from the data generated by the one or more data collectors, wherein the graphical user interface comprises one or more interactive elements for analyzing at least the portion of the information extracted from the data generated by the one or more data collectors, and wherein the one or more information extractors are configured to determine a presence of a vulnerability within the unknown binary based at least in part on analysis performed in response to inputs received via the one or more interactive elements.

10. The method of claim 9, further comprising:

storing the data generated by the one or more data collectors and the information extracted from the data generated by the one or more data collectors to a primary datastore; and storing at least the portion of the information extracted from the data generated by the one or more data collectors to a secondary datastore, wherein at least the portion of the information extracted from the data generated by the one or more data collectors is output to the graphical user interface via an application programming interface from the second data, and wherein the application programming interface is configured to enable searching of at least the portion of the information extracted from the data generated by the one or more data collectors from the second datastore via one of the one or more interactive elements of the graphical user interface.

11. The method of claim 1, wherein the at least one data collector of the first pipeline comprises a plurality of data collectors including at least a first data collector, a second data collector, and a third data collector, wherein the first data collector is configured to generate the data, wherein the second data collector is configured to generate second data based on the data and the third data collector is configured to generate third data based on the data, the second data and third data comprising intermediate representations that are different from each other and the first intermediate representation corresponding to the data, and wherein the second data collector and the third data collector are configured to operate in parallel subsequent to generation of the data by the first data collector.

12. The method of claim 11, wherein the at least one information extractor of the first pipeline comprises a plurality of information extractors including at least a first information extractor and a second information extractor, the first information extractor configured to determine whether a vulnerability is present in the unknown binary based on data generated by the first data collector, the second data collector, or both, and the second information extractor configured to determine whether a vulnerability is present in the unknown binary based on data generated by the first data collector, the third data collector, or both, and wherein the first information extractor is configured to operate in parallel with respect to the second information extractor.

13. The method of claim 1, further comprising generating a reverse software bill of materials for the unknown binary based on the data generated by the one or more data collectors, the information extracted from the data generated by the one or more data collectors by the at least one information extractor, or a combination thereof, wherein the reverse software bill of materials comprises information associated with vulnerabilities determined to be present in the unknown binary, software components associated with the unknown binary, dependencies between the software components, license information associated with the software components, risk assessment information associated with the unknown binary, or a combination thereof.

14. A non-transitory computer-readable medium storing instructions that, when executed by one or more processors, cause the one or more processors to perform operations comprising:

receiving an input dataset comprising at least an unknown binary, wherein the unknown binary is associated with unknown or incomplete source code, documentation, software bill of material (SBOM), or any combination thereof;

initializing, based on at least a type of data of the input dataset, one or more pipelines configured to analyze the unknown binary, wherein each pipeline of the one or more pipelines comprises at least one data collector executable by the one or more processors and at least one information extractor executable by the one or more processors;

generating, via one or more data collectors of a first pipeline of the one or more pipelines, data based on the unknown binary, wherein the data comprises a first intermediate representation of at least a portion of the unknown binary, wherein each of the one or more data collectors are configured to process a respective type of data;

determining, via the at least one information extractor of the first pipeline, whether a vulnerability is present in the unknown binary based on a similarity between one or more characteristics of information extracted from the data generated by the one or more data collectors of the first pipeline and information associated with at least one known vulnerability; and generating a reverse software bill of materials for the unknown binary based on the data generated by the one or more data collectors, the information extracted from the data generated by the one or more data collectors by the at least one information extractor, or a combination thereof, wherein the reverse software bill of materials comprises information associated with vulnerabilities determined to be present in the unknown binary, software components associated with the unknown binary, dependencies between the software components, license information associated with the software components, risk assessment information associated with the unknown binary, or a combination thereof.

15. The non-transitory computer-readable medium of claim 14, wherein the software components are identified, at least in part, based on a function call graph generated based on the unknown binary.

16. The non-transitory computer-readable medium of claim 14, wherein the initializing the one or more pipelines comprises initializing a plurality of pipelines, the plurality of pipelines comprising the first pipeline and a second pipeline, the second pipeline comprising one or more second data collectors and one or more second information extractors, wherein the one or more second data collectors of the second pipeline are configured to generate second data comprising a second intermediate representation for the unknown binary, wherein the second intermediate representation is different from the first intermediate representation, wherein the one or more second information extractors are configured to determine whether a vulnerability is present in the unknown binary based on information extracted from the second intermediate representation, and wherein the first pipeline and the second pipeline operate in parallel.

17. The non-transitory computer-readable medium of claim 14, the operations further comprising outputting, to a graphical user interface, at least a portion of the information extracted from the data generated by the one or more data collectors.

18. A system comprising:

a memory comprising a primary datastore and a secondary datastore;

one or more processors communicatively coupled to the memory, the one or more processors configured to:

initialize, based on at least a type of data, one or more pipelines configured to analyze an unknown binary, wherein the unknown binary is associated with unknown or incomplete source code, documentation, software bill of material (SBOM), or any combination thereof, wherein each pipeline of the one or more pipelines comprises at least one data collector executable by the one or more processors and at least one information extractor executable by the one or more processors, wherein each of the at least one data collector is configured to process a respective type of data;

generate, via one or more data collectors of a first pipeline of the one or more pipelines, data based on the unknown binary, wherein the data comprises a first intermediate representation of at least a portion of the unknown binary;

store the data at the primary datastore;

determine, via the at least one information extractor of the first pipeline, whether a vulnerability is present in the unknown binary based on a similarity between one or more characteristics of information extracted from the data generated by the one or more data collectors of the first pipeline and information associated with at least one known vulnerability;

store the information extracted from the data generated by the one or more data collectors in the primary datastore and the portion of the information extracted from the data generated by the one or more data collectors in the secondary datastore;

output, to a graphical user interface, information associated with a vulnerability determined to be present in the unknown binary, at least a portion of the information extracted from the data generated by the one or more data collectors, or both, wherein the portion of the information extracted from the data generated by the one or more data collectors is stored in the secondary datastore and output to the graphical user interface via an application programming interface configured to enable interaction with the portion of the information extracted from the data generated by the one or more data collectors from the secondary datastore via interactive elements of the graphical user interface; and generate a reverse software bill of materials for the unknown binary based on the data generated by the one or more data collectors, the information extracted from the data generated by the one or more data collectors by the at least one information extractor, or a combination thereof, wherein the reverse software bill of materials comprises information associated with vulnerabilities determined to be present in the unknown binary, software components associated with the unknown binary, dependencies between the software components, license information associated with the software components, risk assessment information associated with the unknown binary, or a combination thereof.

19. The system of claim 18, wherein the one or more pipelines comprise a plurality of pipelines that includes the first pipeline and a second pipeline, the second pipeline comprising one or more second data collectors and one or more second information extractors, wherein the one or more second data collectors of the second pipeline are configured to generate second data comprising a second intermediate representation for the unknown binary, wherein the second intermediate representation is different from the first intermediate representation, wherein the one or more second information extractors are configured to determine whether a vulnerability is present in the unknown binary based on information extracted from the second intermediate representation, and wherein the first pipeline and the second pipeline operate in parallel.

20. The system of claim 18, wherein the one or more processors are configured to generate a reverse software bill of materials for the unknown binary based on the data generated by the one or more data collectors, the information extracted from the data generated by the one or more data collectors by the at least one information extractor, or a combination thereof, wherein the reverse software bill of materials comprises information associated with vulnerabilities determined to be present in the unknown binary, software components associated with the unknown binary, dependencies between the software components, license information associated with the software components, risk assessment information associated with the unknown binary, or a combination thereof.

* * * * *